(12) United States Patent
Felder

(10) Patent No.: US 7,821,501 B2
(45) Date of Patent: Oct. 26, 2010

(54) TOUCH SCREEN DRIVER AND METHODS FOR USE THEREWITH

(75) Inventor: Matthew D. Felder, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 882 days.

(21) Appl. No.: 11/304,306

(22) Filed: Dec. 14, 2005

(65) Prior Publication Data

US 2007/0132739 A1    Jun. 14, 2007

(51) Int. Cl.
*G09G 5/00* (2006.01)
(52) U.S. Cl. .................................... 345/173; 178/18.01
(58) Field of Classification Search ................. 345/173, 345/174, 175, 176, 180, 156, 158; 178/18.01, 178/18.06, 18.03, 18.04, 18.05, 19.05, 19.01, 178/19.03; 235/462.46; 710/20; 701/1; 715/700
See application file for complete search history.

(56) References Cited

U.S. PATENT DOCUMENTS

| | | | | |
|---|---|---|---|---|
| 5,933,102 A | * | 8/1999 | Miller et al. | 341/33 |
| 6,738,048 B1 | * | 5/2004 | Rundel | 345/173 |
| 7,411,581 B2 | * | 8/2008 | Hardie-Bick | 345/173 |
| 2005/0212916 A1 | * | 9/2005 | Nakamura et al. | 348/207.99 |
| 2006/0097991 A1 | | 5/2006 | Hotelling et al. | |
| 2007/0236478 A1 | | 10/2007 | Geaghan et al. | |

FOREIGN PATENT DOCUMENTS

| | | |
|---|---|---|
| JP | 200718086 A | 1/2007 |
| KR | 1020040042150 A | 5/2004 |

* cited by examiner

*Primary Examiner*—Abbas I Abdulselam

(57) ABSTRACT

A touch screen driver includes a conditioner module for conditioning a first input/output port of a touch screen. The conditioner module includes a precharge module for charging the first input/output port to a precharge voltage in response to a precharge signal, and a pull-up module for maintaining the precharge voltage for detecting a touch event.

33 Claims, 11 Drawing Sheets

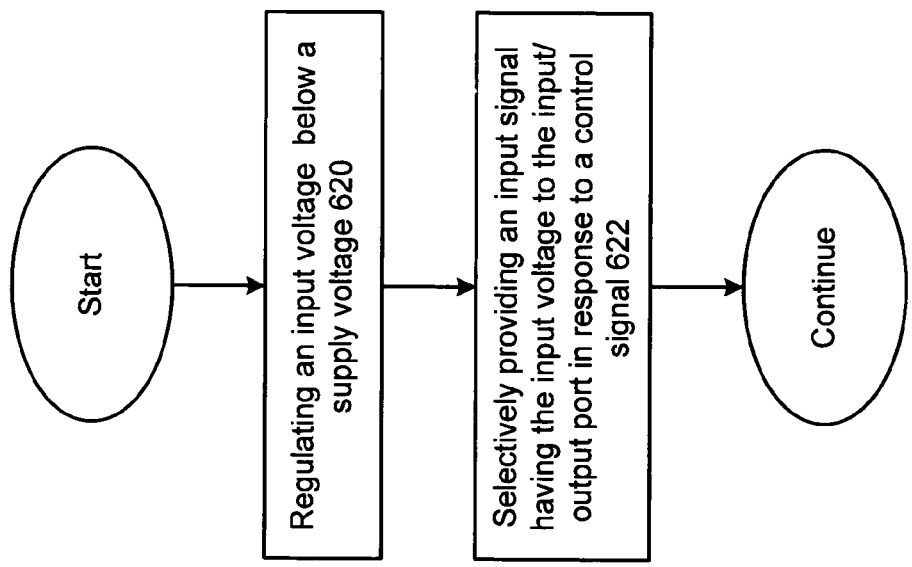

TOUCH SCREEN DRIVER AND METHODS FOR USE THEREWITH

CROSS REFERENCE TO RELATED PATENTS

None

TECHNICAL FIELD OF THE INVENTION

The present invention relates to touch screen drivers, touch screens and related methods used in devices such as handheld devices.

DESCRIPTION OF RELATED ART

Display screens capable of touch input or touch screens, are used in a wide variety of electronic equipment including portable, or handheld, devices. Such handheld devices include personal digital assistants (PDA), CD players, MP3 players, DVD players, AM/FM radios, pagers, and cellular telephones, etc. Each of these handheld devices includes one or more integrated circuits to provide the functionality of the device.

The power consumed by such touch screens can add significantly to the power of such devices. Minimizing power consumption is an important consideration in portable or handheld devices in order to increase the battery life and decrease the cost and weight of the device.

The need exists for touch screen drivers that can be implemented efficiently on an integrated circuit, and that can help reduce the power consumption of the device.

BRIEF DESCRIPTION OF THE SEVERAL VIEWS OF THE DRAWINGS

FIG. 14 presents a flowchart representation of a method in accordance with an embodiment of the present invention.

DETAILED DESCRIPTION OF THE INVENTION INCLUDING THE PRESENTLY PREFERRED EMBODIMENTS

The embodiments of the present invention yield several advantages over the prior art. A touch screen driver saves power and can be easily implemented in, for instance, an integrated circuit implementation.

Figure 1:
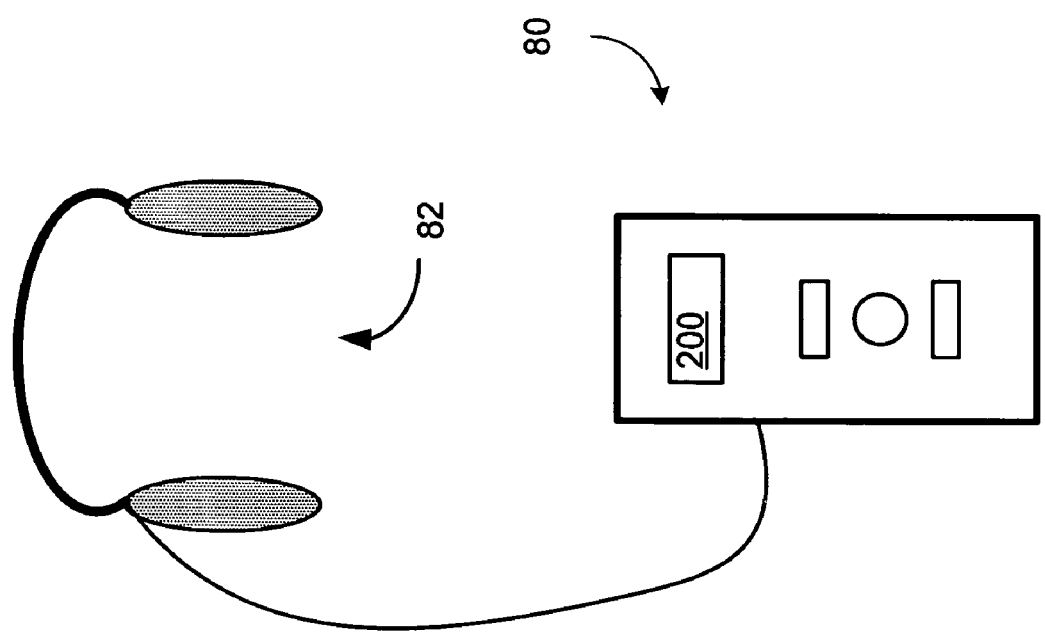
FIG. 1 presents a pictorial diagram representation of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal. In an embodiment of the present invention, the radio signal includes one or more of a broadcast frequency modulated (FM) radio signal, an in-band on-channel (IBOC) digital radio signal, a Bluetooth signal, a broadcast amplitude modulated (AM) radio signal, a broadcast satellite radio signal, and a broadcast cable signal.

In operation, the handheld audio system 80 produces an audio output for a user by means of headphones 82 or other speaker systems. In addition to producing an audio output from the received radio signal, the handheld audio system 80 can optionally process stored MP3 files, stored WMA files, and/or other stored digital audio files to produce an audio output for the user. The handheld audio system 80 may also include video features as well. Handheld audio system 80 includes a touch screen 200 for providing a user interface for controlling the device. Handheld audio system 80 further includes a touch screen driver 275 and/or one or more integrated circuits (ICs) that implement the features and functions in accordance with one or more embodiments of the present invention that are discussed herein.

Figure 2:
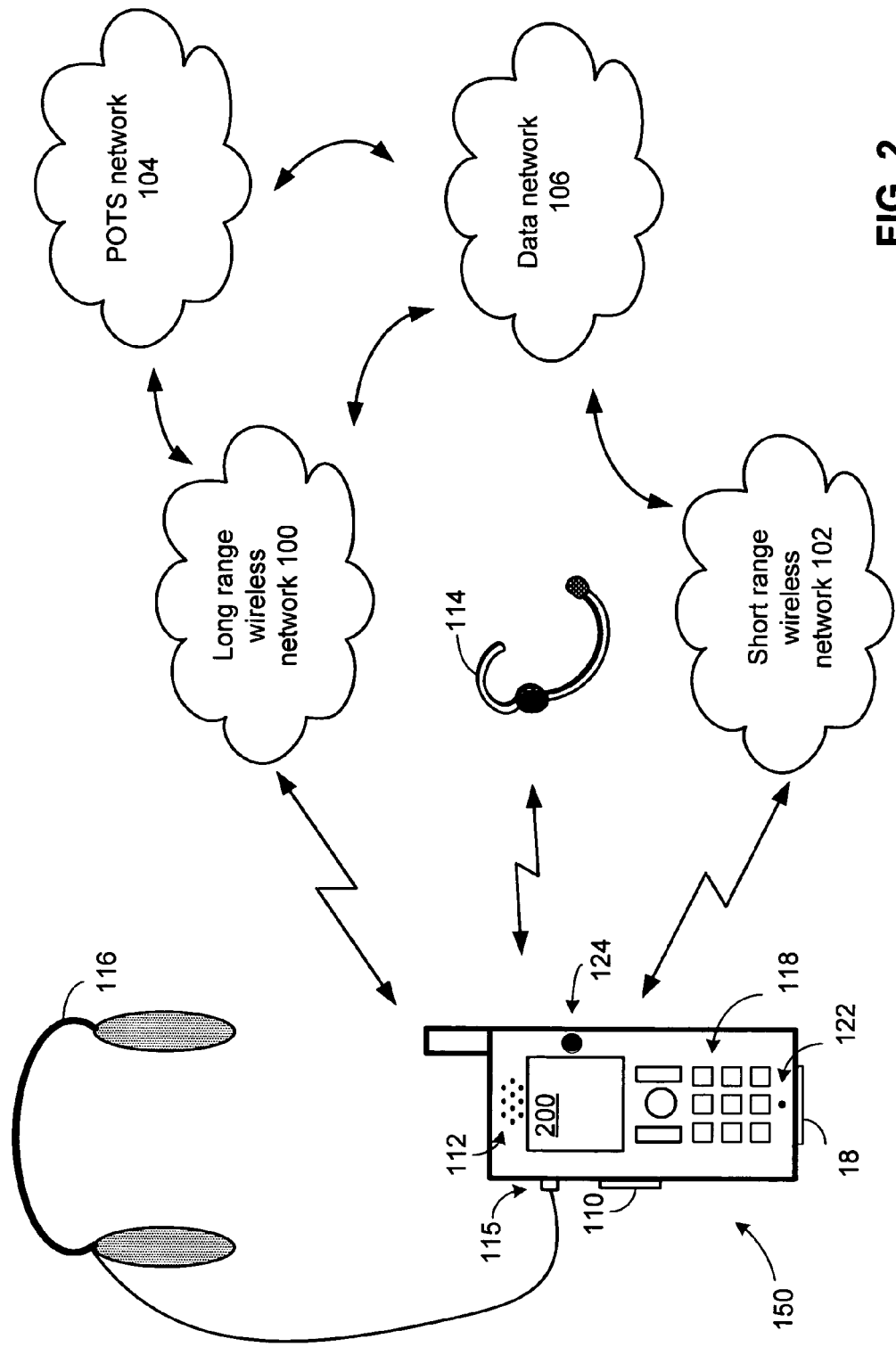
FIG. 2 presents a pictorial diagram representation of a multifunction portable device in accordance with an embodiment of the present invention.

FIG. 2 presents a pictorial diagram representation of a multifunction portable device in accordance with an embodiment of the present invention. In particular, a multifunction portable device 150 communicates over a long range wireless network 100 that is operably coupled to the plain old telephone service (POTS) network 104 and data network 106. Multifunction portable device 150 can further communicate over short range wireless network 102 to data network 106. In an embodiment of the present invention, long range network 100 includes a wireless telephone network such as cellular, personal communications service (PCS), general packet radio service (GPRS), global system for mobile communications (GSM), and integrated digital enhanced network (iDEN) or other wireless communications network capable of sending and receiving telephone calls. Further, data network 106 includes the Internet and short range wireless network 102 includes an access point that communicates with the multifunction portable device 150 via a radio frequency communications link such as 802.11x, Wimax, a wireless local area network connection of other communications link. In this fashion, multifunction portable device 150 can place and receive telephone calls, text messages such as emails, short message service (SMS) messages, pages and other data messages that may include multimedia attachments such as documents, audio files, video files, images and other graphics.

Multifunction portable device 150 optionally includes a camera 124 for capturing still and/or video images, removable memory card 100 for providing additional memory and removable storage, and host interface 18 for uploading and downloading information directly to a host device such as a computer.

Figure 4:
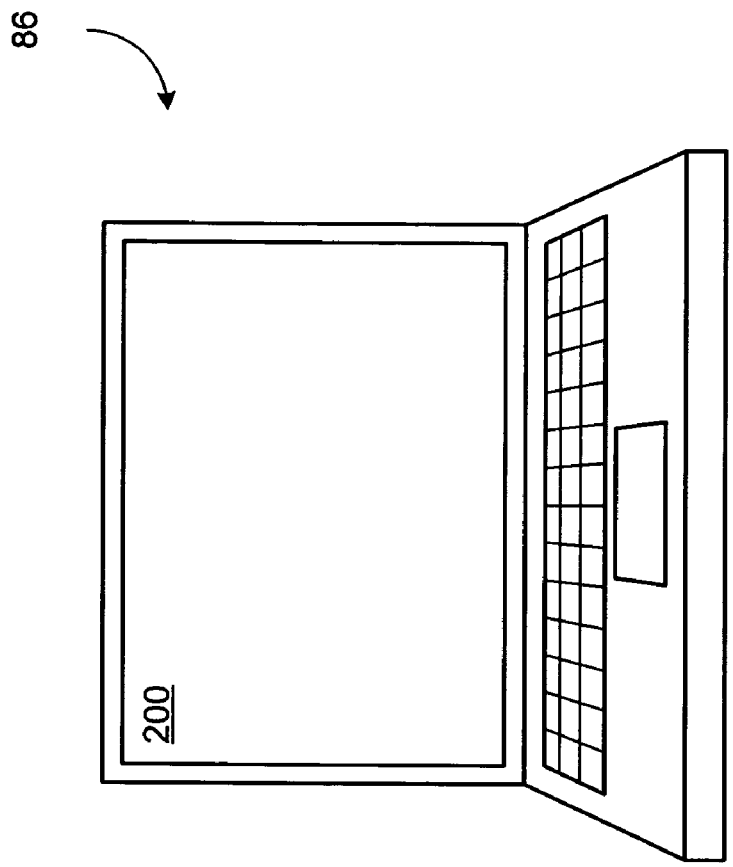
FIG. 4 presents a pictorial diagram representation of a computer in accordance with an embodiment of the present invention.
Figure 3:
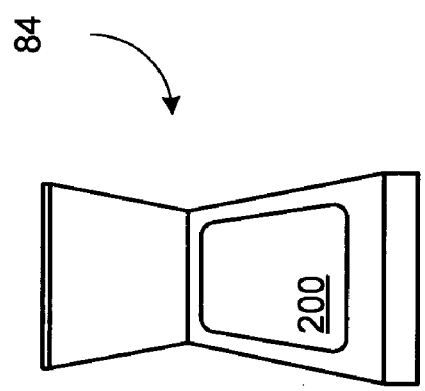
FIG. 3 presents a pictorial diagram representation of a personal digital assistant in accordance with an embodiment of the present invention.

Multifunction portable device 150 includes internal audio input device such as microphone 122 and internal audio output device such as speaker 112. In addition, headphones 116 can optionally be connected via headphone jack 115. Wireless headset 114 further includes an audio input device and audio output device that are connected to wireless headset 150 by a short range wireless communications link that uses an infrared link such as IrDA, or a radio frequency communications link conforming to the Bluetooth standard. The user interface of multifunction portable device 150 includes a keypad 118 and a display device, such as touch screen 200, for displaying graphics and text, and for providing an additional touch sensitive interface with soft keys and/or graphics input and or handwriting recognition. Multifunction portable device 150 includes a touch screen driver 275 and/or one or more integrated circuits (ICs) that implement the features and functions in accordance with one or more embodiments of the present invention that are discussed herein FIG. 3-4 present pictorial diagram representations of a personal digital assistant and computer in accordance with an embodiment of the present invention. While the preceding disclosure has been directed to a touch screen driver 275 used in conjunction with handheld audio system 80 and/or multifunction portable device 150, in an embodiment of the present invention, the touch screen driver 275 be implemented by itself or part of other integrated circuits including a system on a chip integrated circuit. While implemented as part of an integrated circuit or as part of a system on a chip integrated circuit, this touch screen driver 275 can be used in a wide variety of electronic devices such as personal digital assistant 84, in computer 86, or in a variety of other electronic devices that include a touch screen.

Figure 5:
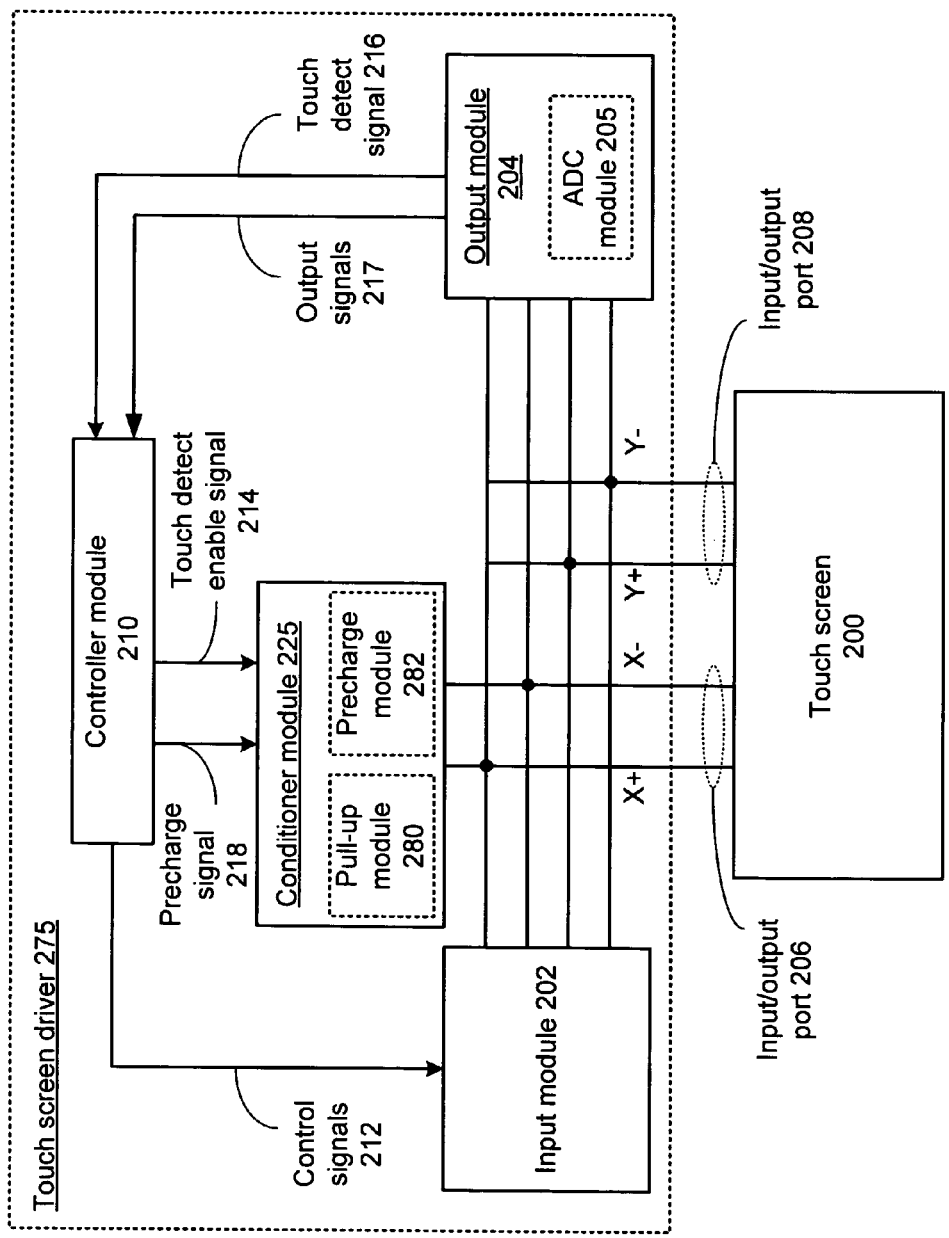
FIG. 5 presents a block diagram representation of a touch screen driver in accordance with an embodiment of the present invention.

FIG. 5 presents a block diagram representation of a touch screen driver in accordance with an embodiment of the present invention. Touch screen driver 275 includes a conditioner module 225 for conditioning an input/output port 206 of a touch screen 200. The conditioner module 225 includes a precharge module 282 for charging the input/output port 206 to a precharge voltage in response to a precharge signal 218. Conditioner module 225 further includes a pull-up module 280 for maintaining the precharge voltage for detecting a touch event. An output module 204 is operably coupled to the input/output ports 206 and 208. Output module 204 detects a touch event based on an output voltage and generates a touch detect signal 216 in response to the detection of the touch event. Output module 204 is further includes an analog to digital converter (ADC) module 205 that is operable to sample and digitize output voltages from input/output ports 206 and 208 and to supply corresponding output signals 217 to controller module 210. A controller module 210 is operably coupled to the conditioner module 225 and the output module 204 for generating the precharge signal 218 and for generating control signals 212 in response to the touch detect signal 216. An input module 202 is operably coupled to the controller module 210 for selectively providing an input signal having an input voltage to the input/output port 206 in response to the control signals 212. Controller module 210 is further operable to calculate the x-y coordinates or region of a touch event of touch screen 200.

While FIG. 5 shows a self-contained precharge module 282 associated with conditioner module 225, in an embodiment of the present invention, conditioner module 225, and particularly precharge module 282, can use pull-up FETs from input module 202 for this purpose.

In an embodiment of the present invention, the input module 202 includes a voltage regulator for regulating the input voltage below a supply voltage. In an embodiment of the present invention, the input voltage is less than the precharge voltage. While the touch screen 200 is typically implemented using a resistive device with relatively low resistance in the range of $200\Omega$ to $800\Delta\Omega$, the power consumed by the touch screen is reduced by driving the touch screen at a reduced voltage. However, the various embodiments of the present invention can be applied likewise to touch screens, such as those employing non-overlay touch-panels, that have higher impedances. Further, as an additional advantage, the conditioner module 225 uses a high impedance pull-up module 280 that draws very little current until the touch screen 200 is driven by input module 202.

Figure 11:
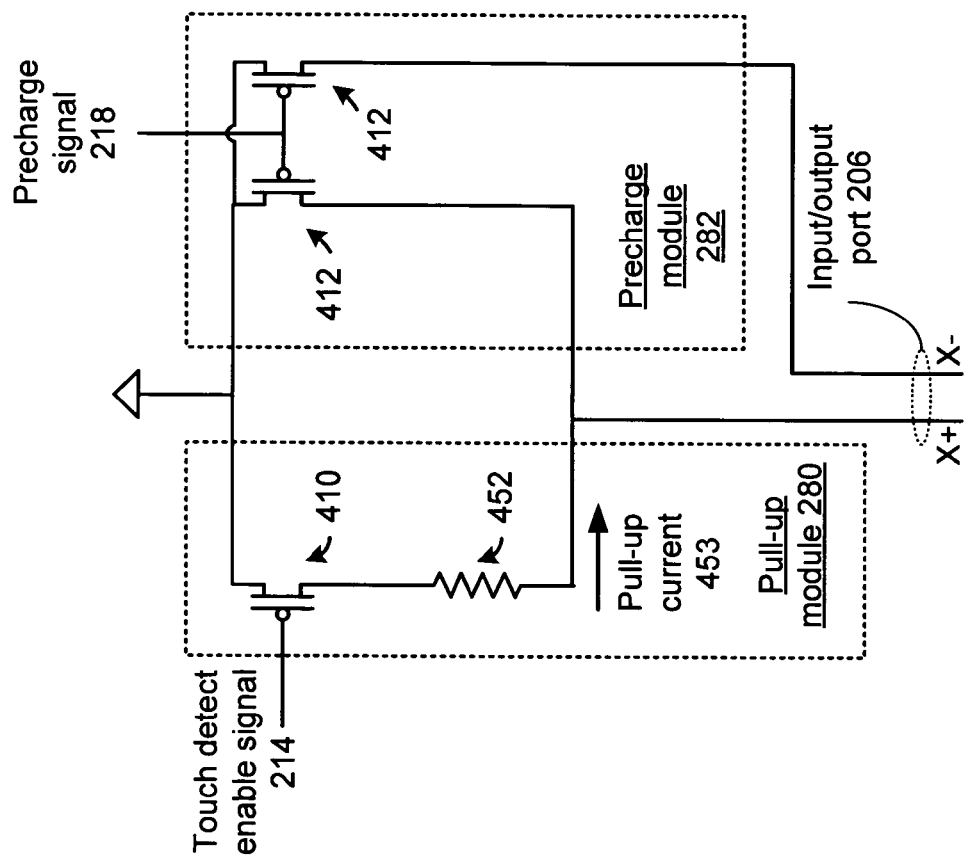
FIG. 11 presents a schematic diagram representation of a pull-up module and precharge module in accordance with an embodiment of the present invention.

While the conditioner module 225 is shown as being coupled to input/output port 206, either input/output port 206 or 208 can be conditioned to detect a touch event in accordance with the present invention, as will become evident when described further in conjunction with FIG. 11.

In an embodiment of the present invention, controller module 210 can be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 6:
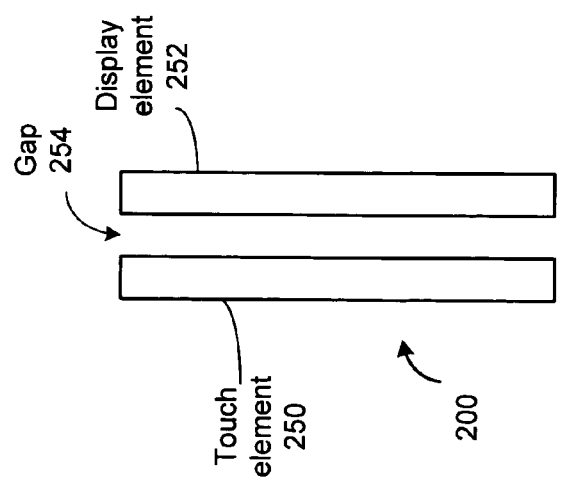
FIG. 6 presents an expanded side view of a touch screen in accordance with an embodiment of the present invention.

FIG. 6 presents an expanded side view of a touch screen in accordance with an embodiment of the present invention. In particular, touch screen 200 includes a transparent touch element 250 and a display element 252, such as a liquid crystal display, that are separated by a gap 254. In particular, touch element 250 and display element 252 include resistive sheets. When touch element 250 is pressed by the user at a particular an x-y coordinate or region of the touch screen 200, the resistive element of touch element 250 comes into contact with the resistive element of display element 252 and closes a circuit as described in conjunction with FIGS. 7-9 that follows.

Figure 7:
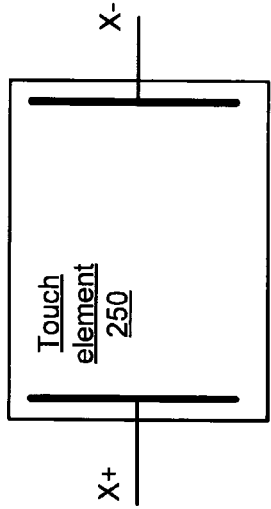
FIG. 7 presents a schematic diagram representation of a touch element in accordance with an embodiment of the present invention.
Figure 8:
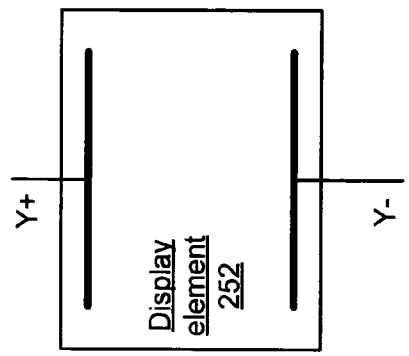
FIG. 8 presents a schematic diagram representation of a display element in accordance with an embodiment of the present invention.

FIGS. 7-8 present schematic diagram representations of a touch element and display element in accordance with an embodiment of the present invention. In particular, the resistive sheets of touch element 250 and display element 252 are coupled by a pair of electrodes to leads X+/X− and Y+/Y−. The resistive sheets contact one another when the touch screen 200 is touched by a user and form a resistive voltage divider that can be used to ascertain the x-y coordinates or region that was touched.

While FIGS. 7-8 present a configuration whereby the x-axis is included on the touch element 250 and the y-axis is included on the display element 252, other configurations are likewise possible. Further, while a four-wire configuration is shown, other configurations including two or three wires, five wires or more are likewise possible within the broad scope of the present invention.

Figure 9:
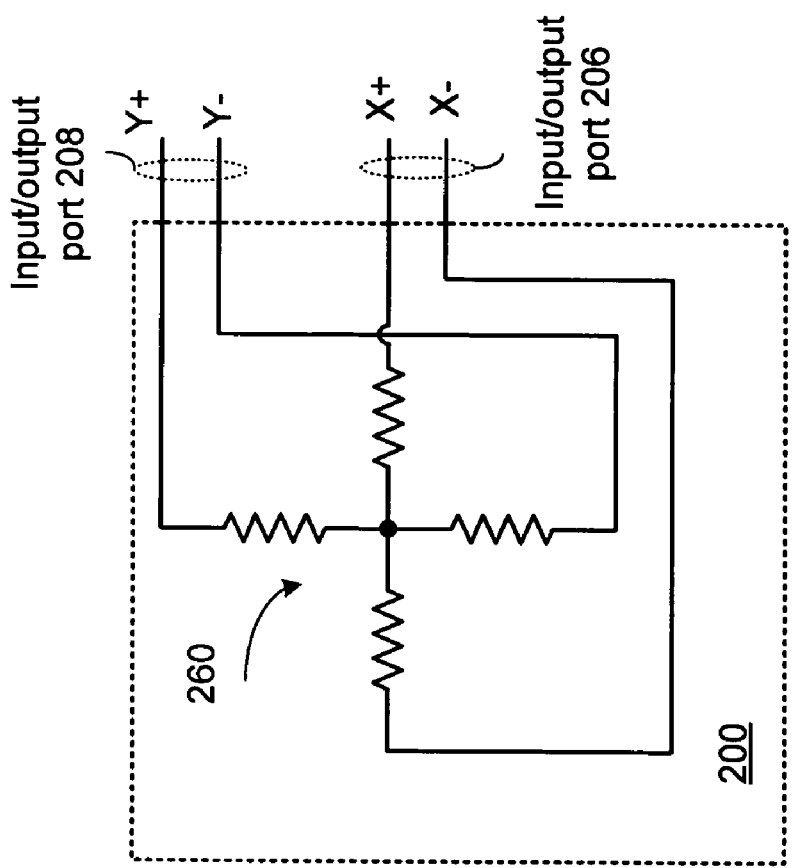
FIG. 9 presents a schematic diagram representation of a touch screen in accordance with an embodiment of the present invention.

FIG. 9 presents a schematic diagram representation of a touch screen in accordance with an embodiment of the present invention. In particular, the circuit equivalent of touch screen 200 is shown in a condition where the screen has been touched. The particular x-y coordinates or location of the touch can be determined by driving the input/output port 206 with an input signal containing an input voltage and measuring an output voltage from input/output port 208, and further by driving the input/output port 208 with an input signal containing an input voltage and measuring an output voltage from input/output port 206. In an embodiment of the present invention, the input signal is a differential signal and the output signal is measured in common mode from either the positive or negative terminal of the input/output port 206 or 208.

Figure 10:
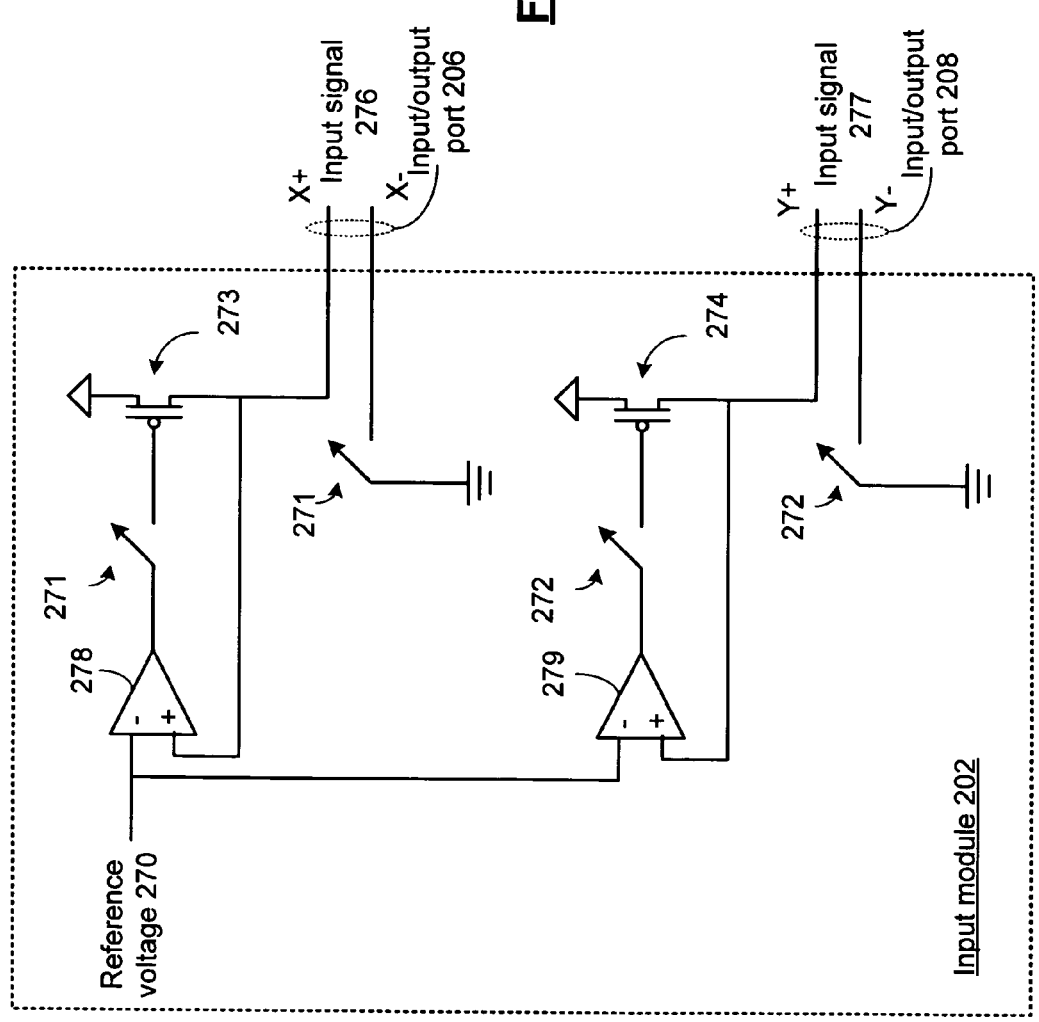
FIG. 10 presents a schematic diagram representation of a input module in accordance with an embodiment of the present invention.

FIG. 10 presents a schematic diagram representation of an input module in accordance with an embodiment of the present invention. In particular, input module 202 includes amplifiers 278 and 279 for selectively regulating input voltages 276 and 277 to a reference voltage 270.

In operation, switches 271 and 272 are controlled by control signals 212 that provide separate controls to these switches. The input module 202 remains normally disconnected from input/output ports 206 and 208 because switches 271 and 272 are open and transistors 273 and 274 are turned off. In response to a touch event being detected, controller module 210 provides control signals 212 that alternatively closes switches 271 and switches 272. When the switches 271 are closed, reference voltage 270, which is generated to be below the supply voltage, is driven by amplifier 278 and transistor 273 onto the input signal 276. In this fashion, input signal 276 drives the input/output port 206, corresponding to the x-axis of touch screen, for measurement of the input/output port 208 by output module 204. When switches 272 are closed, reference voltage 270 is driven by amplifier 279 and transistor 274 onto the input signal 277. In this fashion, input signal 277 drives the input/output port 208, corresponding to the y-axis of touch screen, for measurement of the input/output port 206 by output module 204.

While FIG. 10 presents an embodiment that includes two separate voltage regulators, a single voltage regulator circuit could likewise be switched to drive both of the input/output ports 206 and 208. Also, a single amplifier can be used to alternatively drive transistors 273 and 274. In an embodiment of the present invention amplifiers 278 and 279 are selectively powered by control signals 212 so that they are enabled when switches 271 and 272 are closed, and disabled, placed in a low power state and/or powered down when switches 271 and 272 are opened, to further reduce the power consumption of touch screen driver 275. While the control lines to switches 271 and 272, and the switches, transistors, or other circuits for powering down or otherwise disabling transistors 273 and 274 and amplifiers 278 and 279 are not specifically shown, one skilled in the art will appreciate several possible circuit implementations when presented the disclosure wherein. Further, while switches 271 and 272 are shown schematically as single-pole single-throw switches, these elements may likewise be implemented with active circuit components, such as transistors, for implementation as part of an integrated circuit, such as a system on a chip integrated circuit.

In an embodiment of the present invention, reference voltage 270 is generated using a voltage divider, bandgap voltage reference ratio or other circuit to provide a reference voltage 270 with a magnitude of less than the magnitude of the supply voltage. In an embodiment of the present invention, the supply voltage is 3.3 volts, however, a regulated voltage in the range of 0.8 volts-2.0 volts is used to drive the touch screen 200. In an embodiment, the reference voltage 270 is also less than the precharge voltage, such as the approximately 3.3 volt supply voltage used in an embodiment of conditioner module 225.

In an embodiment of the present invention, the reference is designed to be substantially equal to (or slightly less than) the maximum input voltage of the ADC module 205 used in output module 204 to capture and digitize the voltages from input/output port 206 and/or 208. In this fashion, the voltages produced by the resistive voltage divider of touch screen 200 will be within the dynamic range of the ADC module 205. However, other supply voltages and reference voltages can be used within the broad scope of the present invention.

FIG. 11 presents a schematic diagram representation of a pull-up module and precharge module in accordance with an embodiment of the present invention. In particular pull-up module 280 includes a transistor 410 operably coupled to a supply voltage, for conducting a pull-up current 453 in response to a touch detect enable signal 214. A current limiter, such as resistor 452, is operably coupled to transistor 410 and to the input-output port 206, for limiting the pull-up current 453.

In an embodiment of the present invention, resistor 452 has a large resistance such as 100 k$\Omega$, chosen to be greater than the largest resistance of touch screen 200. Before the screen is pressed by the user, touch element 250 and display element 252 are separated by gap 254. Pull up module 280 maintains the voltage of one axis of touch screen 200, such as the x-axis, at the precharge voltage. The other axis of touch screen 200 is coupled to ground. The voltage of the x-axis forms an output voltage that is monitored by output module 204. When the touch screen is pressed by the user, the x-axis is shorted to ground through the y-axis and the corresponding touch screen resistance, that is small compared with the value of resistor 452. The touching of the screen is detected by output module 204 from the drop in the output voltage.

In an embodiment of the present invention, ADC module 205 converts the output voltage to a digital signal that is either compared to a touch event threshold within output module 204 or passed to controller module 210 for comparison. In a preferred embodiment however, the touch event is detected by a single inverter device that consumes much less power than constantly polling the ADC module 205 to check the voltage level. In this circumstance, the ADC module 205 is only used for coordinate location, after the touch event has been detected. In either case, when the output voltage drops below the touch event threshold, a touch detect signal 216 is generated.

In response to the detection of the touch event, touch detect enable signal 214 (an active low signal in this embodiment) is controlled by controller 210 from a low state to a high state to disable the pull-up module during the reading of position of the touch event. Controller 210 further generates control signals 216 to command input module 202 to alternatively drive the x-axis and y-axis of touch screen 200 with input signals, such as input signals 276 and 277. Output module 204 measures the resulting output voltages which correspond to the x-y coordinates or region on touch screen 200 that was touched. Output module 204 passes these measurements as output signals 217 to controller 210.

In an embodiment of the present invention, the input signal are generated in an alternating fashion between x-axis and y-axis. Output module 204 provides several sample measurements of the corresponding output voltages, so as to provide a more accurate measurement of x-y position. After each position calculation (or after a defined number of position calculations), the touch detection is reactivated by controller 210 turning off the input module and enabling the pull-up module 280 by changing the touch event enable signal 216 to a low state. Touch screen 200 includes a parasitic capacitance that could take an undesirably long time to charge given the high impedance of resistor 452.

Precharging of the input/output port 206 is more rapidly accomplished by precharge module 282. In response to the beginning of a touch detect enable signal, controller module 210 generates a precharge signal 218 that turns on transistors 412 to supply precharge currents that rapidly charge both terminals of the input/output port to the precharge voltage. In the circuit shown the precharge voltage is substantially equal to the supply voltage of 3.3 volts. In an embodiment of the present invention, the precharge signal includes precharge pulse having a predetermined duration that, based on the parasitic capacitance of touch screen 200 and the current supplied by transistor 412, is sufficient charge the input/output port 206 to the precharge voltage. While separate transistors 412 are shown for charging the terminals of input/output port 206, in an alternative embodiment, a single transistor may be employed to charge one terminal directly (either the plus terminal or the minus terminal) and the other terminal indirectly through the x-axis touch screen resistance.

The foregoing description presents circuit implementations in a four-wire touch screen configuration, the input voltages to the x and y axes can be applied simultaneously in alternative touch screen configurations such as an eight-wire configuration that include separate x and y axes on both the touch element 250 and the display element 252.

Figure 12:
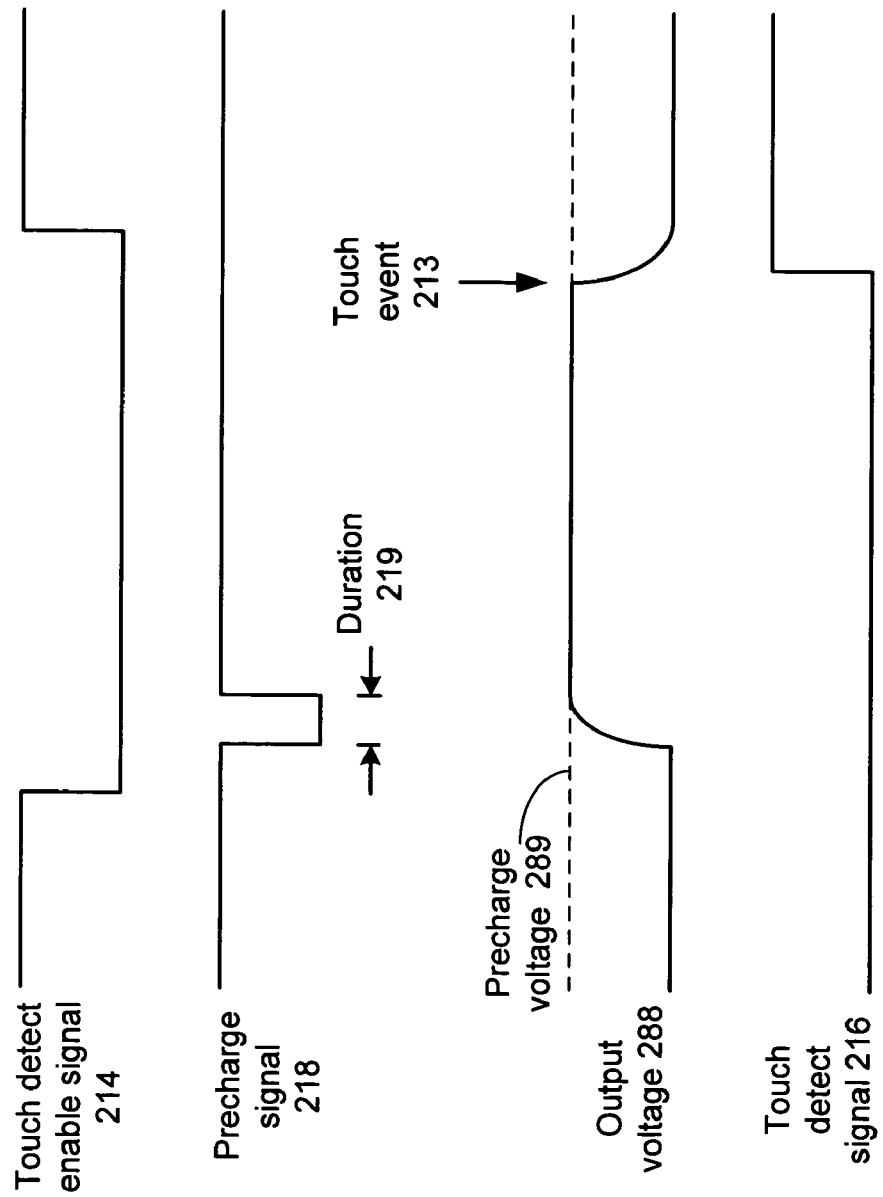
FIG. 12 presents a timing diagram in accordance with an embodiment of the present invention.

FIG. 12 presents a timing diagram in accordance with an embodiment of the present invention. When a touch event is ready to be detected, touch detect enable signal 214 (in this embodiment, an active low signal) is dropped low by controller module 210. Controller module 210 generates a precharge signal 218 (in this embodiment, an active low signal) having a pulse of duration 219. In response, conditioner module 225 drives input/output port 206 in common mode with both the plus and minus terminals pulled high. Output voltage 288—the common mode voltage monitored by output module 204 from input/output port 206, rises to precharge voltage 289. When the output voltage 288 falls below a touch event threshold in response to a touch event 213, touch detect signal 216 is generated.

In an embodiment of the present invention, the precharge signal 218 is triggered by controller 210 with the start of the touch enable signal 218 and generated by a hardware circuit. In this fashion, while precharge signal 218 is triggered by controller 210, the timing of the predetermined period can be implemented without the use of computational power of controller 210. In particular, such hardware circuits include a pulse generator, one-shot circuit or other circuit that generates a pulse having predetermined duration that is derived based on a timing parameter, such as a resistor-capacitor (RC) time constant, delay time, oscillation or other time period. Such hardware circuits further include digital circuits such as a realtime clock, or digital timer such as a counter clocked by a clock signal. In an alternative embodiment of the present invention, controller 210 generates the precharge signal 218 based on a software timing parameter such as a number of clock cycles or other program operations.

Figure 13:
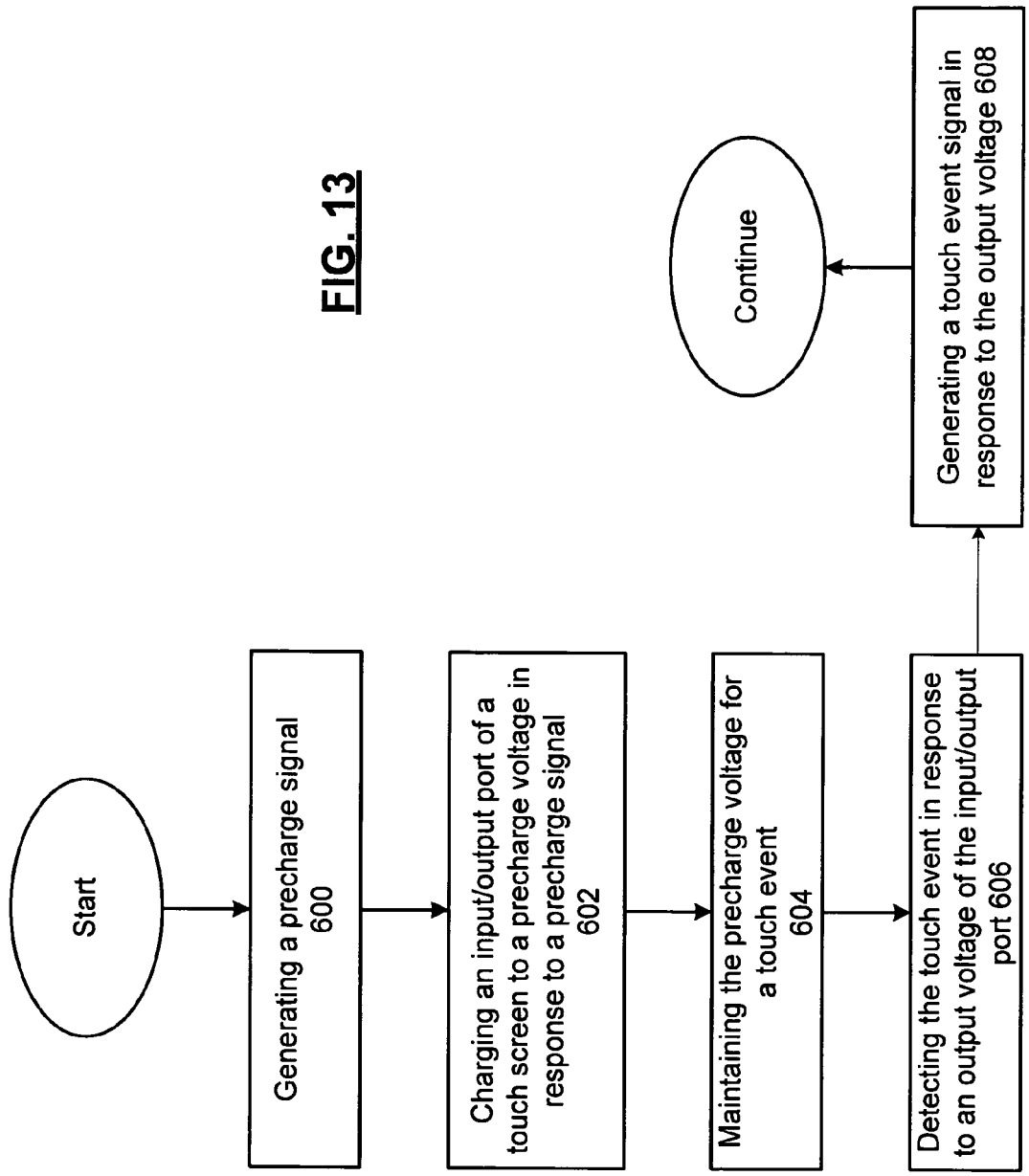
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more of the features and functions described in association with FIGS. 1-12. In step 600, a precharge signal is generated. In step 602, an input/output port of a touch screen is charged to a precharge voltage in response to the precharge signal. In step 604, the precharge voltage is maintained for detecting a touch event. In step 606, the touch event is detected in response to an output voltage of the input/output port. In step 608, a touch detect signal is generated in response to an output voltage.

In an embodiment of the present invention, the precharge signal includes a precharge pulse having a predetermined duration. Further, step 604 includes disabling the precharge voltage in response to the touch event.

FIG. 14 presents a flowchart representation of a method in accordance with an embodiment of the present invention. In particular, a method is presented for use in conjunction with one or more of the features and functions described in association with FIGS. 1-13. In step 620, an input voltage is regulated below a supply voltage. In step 622, an input signal having the input voltage is selectively provided to the first input/output port of the touch screen in response to the touch event. In an embodiment of the present invention, the input voltage is less than the precharge voltage.

In preferred embodiments, the various circuit components are implemented using 0.35 micron or smaller CMOS technology. Provided however that other circuit technologies, both integrated or non-integrated, may be used within the broad scope of the present invention. While the various embodiments presented in conjunction with FIGS. 10 and 11 use MOSFET transistors, other devices including other transistor technologies, such as junction field effect transistors, bipolar junction transistors, metal-semiconductor field effect transistors, high electron mobility transistors, thin film transistors and others can likewise be employed.

Various embodiments of the present invention disclose a positive power supply voltage and a ground terminal. Negative power supply voltages may be likewise used with corresponding changes to the description that will be apparent to one skilled in the art. The ground terminal may be a circuit ground, virtual ground or other ground connection. Further, dual power supplies may be used with opposing polarities in place of a single supply and ground.

Various elements and modules embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a touch screen driver. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A touch screen driver comprising:
a conditioner module, for conditioning a first input/output port of a touch screen, the conditioner module including a precharge module for charging the first input/output port to a precharge voltage in response to a precharge signal, and a pull-up module for maintaining the precharge voltage at the first input/output port until a touch event;
an output module, operably coupled to the first input/output port for detecting the touch event based on a change in a voltage at the input/output port from the precharge voltage to another voltage resulting from the touch event, and for generating a touch detect signal in response to the detection of the touch event; and
a controller module, operably coupled to the conditioner module and the output module, for generating the precharge signal.

2. The touch screen driver of claim 1, wherein the controller module is for generating a control signal in response to the touch detect signal and further comprising:
an input module, operably coupled to the controller module, for selectively providing an input signal having an input voltage to the first input/output port in response to the control signal, the input module including a voltage regulator for regulating the input voltage below a supply voltage.

3. The touch screen driver of claim 2 wherein the input module selectively provides the input signal to a second input/output port.

4. The touch screen driver of claim 2 wherein the input voltage is less than the precharge voltage.

5. The touch screen driver of claim 1 wherein the precharge signal includes a precharge pulse having a predetermined duration.

6. The touch screen driver of claim 5 wherein the predetermined duration is derived based on a resistor-capacitor time constant.

7. The touch screen driver of claim 5 wherein the predetermined duration is derived based on a number of clock cycles of a clock.

8. The touch screen driver of claim 5 wherein the predetermined duration is generated by a hardware circuit.

9. The touch screen driver of claim 1 wherein the controller module is further to disable the pull-up module in response to the touch event.

10. The touch screen driver of claim 1 wherein the pull-up module includes:
a transistor, operably coupled to a supply voltage, for conducting a pull-up current in response to a touch detect enable signal; and
a current limiter, operably coupled to the transistor and to the first input-output port, for limiting the pull-up current.

11. The touch screen driver of claim 1 wherein the precharge module includes:
a first transistor, operably coupled to a supply voltage, for conducting a first precharge current in response to the precharge signal.

12. The touch screen driver of claim 11 wherein the precharge module includes:
a second transistor, operably coupled to a supply voltage, for conducting a second precharge current in response to the precharge signal.

13. The touch screen driver of claim 1 wherein the pull-up module is configured to maintain the precharge voltage while a touch detect enable signal is asserted, the touch detect enable signal different from the precharge signal.

14. A touch screen driver comprising:
a conditioner module for conditioning a first input/output port of a touch screen, the conditioner module including a precharge module for charging the first input/output port to a precharge voltage in response to a precharge signal, and a pull-up module for maintaining the precharge voltage until a touch event at the touch screen.

15. The touch screen driver of claim 14 further comprising:
a controller module, operably coupled to the conditioner module, for generating the precharge signal.

16. The touch screen driver of claim 15 wherein the precharge signal includes a precharge pulse having a predetermined duration.

17. The touch screen driver of claim 16 wherein the predetermined duration is derived based on a resistor-capacitor time constant.

18. The touch screen driver of claim 16 wherein the predetermined duration is derived based on a number of clock cycles of a clock.

19. The touch screen driver of claim 16 wherein the predetermined duration is generated by a hardware circuit.

20. The touch screen driver of claim 15 wherein the controller module is further operable to disable the pull-up module in response to the touch event.

21. The touch screen driver of claim 15 further comprising:
an input module, operably coupled to the controller module, for selectively providing an input signal having an input voltage to the first input/output port in response to the touch event, the input module including a voltage regulator for regulating the input voltage below a supply voltage.

22. The touch screen driver of claim 21 wherein the input module selectively provides the input signal to a second input/output port.

23. The touch screen driver of claim 21 wherein the input voltage is less than the precharge voltage.

24. The touch screen driver of claim 14 wherein the pull-up module includes:
a transistor, operably coupled to a supply voltage, for conducting a pull-up current in response to a touch detect enable signal;
a current limiter, operably coupled to the transistor and to the first input-output port, for limiting the pull-up current.

25. The touch screen driver of claim 14 wherein the precharge module includes:
a first transistor, operably coupled to a supply voltage, for conducting a first precharge current in response to the precharge signal.

26. The touch screen driver of claim 25 wherein the precharge module includes:
a second transistor, operably coupled to a supply voltage, for conducting a second precharge current in response to the precharge signal.

27. The touch screen driver of claim 15 further comprising:
an output module, operably coupled to the first input/output port and the controller module, for generating a touch detect signal in response to an output voltage.

28. The touch screen driver of claim 14 wherein the conditioner module is implemented on a system on a chip integrated circuit.

29. A method comprising:
generating a precharge signal;
charging an input/output port of a touch screen to a precharge voltage in response to the precharge signal;
maintaining the precharge voltage for detecting a touch event until the touch event;
detecting the touch event in response to a change in an output voltage of the input/output port from the precharge voltage to a second voltage, the change resulting from the touch event; and
generating a touch detect signal in response to the touch event.

30. The method of claim 29 further comprising:
regulating an input voltage below a supply voltage; and
selectively providing an input signal having the input voltage to the first input/output port in response to the touch event.

31. The method of claim 30 wherein the input voltage is less than the precharge voltage.

32. The method of claim 29 wherein the precharge signal includes a precharge pulse having a predetermined duration.

33. The method of claim 29 wherein the step of maintaining a precharge voltage is disabled in response to the touch event.

* * * * *